US012496247B1

(12) United States Patent
Zhang et al.

(10) Patent No.: US 12,496,247 B1
(45) Date of Patent: Dec. 16, 2025

(54) CLAMPING-KNEADING MASSAGE STRUCTURE AND MASSAGER

(71) Applicant: DONGGUAN RUNTIAN TECHNOLOGY CO., LTD., Dongguan (CN)

(72) Inventors: Peng Zhang, Dongguan (CN); Xin Xiao, Dongguan (CN)

(73) Assignee: DONGGUAN RUNTIAN TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 19/177,618

(22) Filed: Apr. 13, 2025

(30) Foreign Application Priority Data

Jan. 7, 2025 (CN) ......................... 202520034021.9
Jan. 7, 2025 (CN) ......................... 202520037380.X

(51) Int. Cl.
*A61H 7/00* (2006.01)

(52) U.S. Cl.
CPC ....... *A61H 7/007* (2013.01); *A61H 2205/082* (2013.01)

(58) Field of Classification Search
CPC .. A61H 7/007; A61H 2208/082; A61H 19/32; A61H 19/34; A61H 9/0057; A61H 9/008; A61H 19/00; A61H 7/005; A61H 7/006; A61H 23/0254; A61M 1/0697
See application file for complete search history.

(56) References Cited

FOREIGN PATENT DOCUMENTS

DE 202024106974 U1 * 1/2025 ............. A61H 7/008

OTHER PUBLICATIONS

Machine Translation of DE-202024106974-U1. Accessed from PE2E Search tool on Oct. 2025. (Year: 2025).*

* cited by examiner

*Primary Examiner* — Joseph D. Boecker
*Assistant Examiner* — Jaeick Jang
(74) *Attorney, Agent, or Firm* — Ming Jiang; OPENPTO US LLC

(57) ABSTRACT

Disclosed are a clamping-kneading massage structure and a massager. The clamping-kneading massage structure includes two massage heads, clamping-kneading members, and a bowl body, where the massage heads are configured for contact with a massage area. Either of the clamping-kneading members includes a clamping-kneading end for clamping and kneading a massage area. The clamping-kneading end of the clamping-kneading member extends into at least one of the two massage heads. The clamping-kneading member is configured to rotate in a first direction, such that one of the two massage heads moves closer to or further away from the other. The bowl body is provided with an opening that fits skin in a massage area. The massage heads are located inside the bowl body. A clamping-kneading massage structure provided in an example of the present disclosure enhances the massage effect and optimizes user experience.

17 Claims, 10 Drawing Sheets

CLAMPING-KNEADING MASSAGE STRUCTURE AND MASSAGER

CROSS REFERENCE TO RELATED APPLICATIONS

The present application claims the priority of Chinese Patent Application No. 202520037380X, filed on Jan. 7, 2025, and Chinese Patent Application No. 2025200340219, filed on Jan. 7, 2025, and the content of which is hereby incorporated by reference in its entirety.

TECHNICAL FIELD

The present disclosure relates to the technical field of massage devices, and particularly relates to a clamping-kneading massage structure and a massager.

BACKGROUND

When symptoms such as poor blood circulation and mammary duct obstruction occur in body parts of a person such as the breast, the medication, surgery, or manual massage is usually adopted to alleviate physical discomfort. However, the medication and surgery have significant side effects, and frequent manual massage is required to ensure therapeutic efficacy (e.g., lactating women experience recurrent galactostasis; and menstruating and gestational women may encounter breast swelling and pain), such that costs are high. Therefore, in order to reduce use costs and enhance living comfort, massagers as common healthcare devices have been widely applied in people's daily lives.

A massager is a device that simulates manual massage through mechanical or electronic means, which helps to relieve muscle fatigue and promote blood circulation. Compression-type massagers are primarily used to massage body parts such as breasts. At present, two types of conventional compression-type massagers are available on the market: in a compression-type massager of the first type, a single massage head repeatedly performs vertical or oscillatory movements to massage a massage area in a way of squeezing; and in a compression-type massager of the second type, one or more massage heads press against a side wall of the massage area and rotates around the massage area to achieve the massage effect. The first type of massagers achieve poor massage efficacy due to relatively dispersed massage of the massage area, and the second type of massagers primarily act on superficial muscular tissues, and have poor effects of stimulation to deeper muscular tubercles (or the above mammary glands), thereby leading to poor user experience.

SUMMARY

In view of the above problems, an objective of the present disclosure is to provide a clamping-kneading massage structure that enhances the massage effect and optimizes user experience, so as to solve the above problems.

The present disclosure is achieved by means of the following technical solution:

In a first aspect, a clamping-kneading massage structure is provided in the present disclosure, and the clamping-kneading massage structure includes two massage heads, clamping-kneading members, and a bowl body, where the massage heads are configured for contact with a massage area; either of the clamping-kneading members includes a clamping-kneading end for clamping and kneading a massage area; the clamping-kneading end of the clamping-kneading member extends into at least one of the two massage heads; the clamping-kneading member is configured to rotate in a first direction, and the first direction is perpendicular to a connection line between the two massage heads; rotation of the clamping-kneading member causes one of the two massage heads to move closer to or further away from the other; the two massage heads move closer to each other to squeeze a massage area, and the two massage heads move apart from each other to release the massage area; the bowl body is provided with an opening that fits skin in a massage area; and the massage heads are located inside the bowl body.

According to the technical solutions in the examples of the present disclosure, the clamping-kneading massage structure includes two massage heads, clamping-kneading members, and a bowl body, where the massage heads are configured for contact with a massage area; either of the clamping-kneading members includes a clamping-kneading end for clamping and kneading a massage area; the clamping-kneading end of the clamping-kneading member extends into at least one of the two massage heads; the clamping-kneading member is configured to rotate in a first direction, and the first direction is perpendicular to a connection line between the two massage heads; and rotation of the clamping-kneading member causes one of the two massage heads to move closer to or further away from the other, and the two massage heads, driven by the clamping-kneading ends, alternately move closer to or further away from each other to perform repeated clamping-kneading massage on a massage area. When the clamping-kneading members rotate to squeeze a massage area, part of the massage area between the two massage heads is clamped and squeezed by the clamping-kneading ends, the massage heads drive other areas around the massage area to deform in a direction away from the massage heads, the massage heads are located inside the bowl body, and the bowl body is capable of preventing the massage area fitted therewith from deforming in a direction away from the massage heads, such that the clamping-kneading ends continuously and stably stimulate a user through clamping-kneading the massage area; a massager provided with the clamping-kneading massage structure of the present disclosure pushes and squeezes skin and flesh around a massage area into the bowl body before massaging, such that the massage area further protrudes into inside of the bowl body, which not only enables the clamping-kneading member to stimulate more body parts of the user during movement, but also increases a compressive force between the clamping-kneading end and the massage area and enhances an effect of massaging the massage area; and the clamping-kneading massage structure provided by the present disclosure enables focused and deep massage of the massage area, having better massage and stimulation effects.

In some examples, the clamping-kneading massage structure further includes a flexible massage sleeve; the flexible massage sleeve is at least partially located inside the bowl body; and the flexible massage sleeve includes the massage heads, and the clamping-kneading ends are in contact with a massage area through the massage heads.

According to the technical solutions in the examples of the present disclosure, the flexible massage sleeve envelopes the clamping-kneading ends, and the clamping-kneading ends are in contact with the massage area through the flexible massage sleeve; on the one hand, the flexible massage sleeve deforms depending on a shape of the massage area, which increases an area where the flexible massage sleeve is fitted with the massage area, and ensures that all parts of the massage area receive a compressive force from the clamping-kneading ends; and on the other hand, the flexible massage sleeve protects skin in the massage area from potential injuries caused by repeated friction by the clamping-kneading ends.

In some examples, the clamping-kneading massage structure further includes a vibration element; the vibration element is arranged between the clamping-kneading end and the flexible massage sleeve; and the vibration element is configured to vibrate an area where the flexible massage sleeve is in contact with the massage area.

According to the technical solutions in the examples of the present disclosure, the vibration element is arranged between the clamping-kneading end and the flexible massage sleeve, which enhances a driving effect of the clamping-kneading ends on the vibration element, and ensures the vibration element follows the clamping-kneading ends to timely squeeze or release the massage area; and the vibration element is configured to vibrate an area where the flexible massage sleeve is in contact with the massage area, and the flexible massage sleeve prevents the vibration element from direct contact with the massage area.

In some examples, the massage head is internally provided with a deformation cavity; the deformation cavity includes a first cavity segment, a second cavity segment, and a third cavity segment; the clamping-kneading ends are located in the first cavity segment; the vibration element is located in the second cavity segment; the third cavity segment is communicated with the first cavity segment and the second cavity segment; an inner wall of the third cavity segment is thicker than an inner wall of the second cavity segment; the clamping-kneading ends of the clamping-kneading member move closer to or further away from each other to narrow or amplify a diameter of the third cavity segment; the inner wall of the second cavity segment abuts against the vibration element to push the vibration element into the third cavity segment; and the diameter of the third cavity segment is narrowed to push the vibration element back into the second cavity segment.

According to the technical solutions in the examples of the present disclosure, the third cavity segment of the deformation cavity is communicated with the first cavity segment and the second cavity segment, the inner wall of the third cavity segment is thicker than the inner wall of the second cavity segment, the flexible massage sleeve absorbs kinetic energy of the vibration element through inherent flexibility, and therefore, when the flexible massage sleeve enveloping the vibration element gets thicker, an effect of absorbing the kinetic energy of the vibration element is better; the vibration element moves between the third cavity segment with a thicker inner wall and the second cavity segment with a thinner inner wall in a reciprocating manner, that is, when the two massage heads move closer to each other, the vibration element is gradually pushed into the second cavity segment from the third cavity segment, and kinetic energy of the vibration element absorbed by an inner wall of the flexible massage sleeve is gradually reduced, such that a vibration stimulation effect of the vibration element on the massage area is enhanced with an increase in a clamping-kneading force from the clamping-kneading ends; and when the two massage heads move apart from each other, the vibration element is gradually pushed into the third cavity segment from the inner wall of the second cavity segment, and kinetic energy of the vibration element absorbed by the inner wall of the flexible massage sleeve is gradually increased, such that the vibration stimulation effect of the vibration element on the massage area is weakened with an decrease in a clamping-kneading force from the clamping-kneading ends. The clamping-kneading massage structure provided in the present disclosure synchronously enhances or weakens effects of vibration stimulation and clamping-kneading stimulation with movement of the vibration element, thereby optimizing user experience.

In some examples, a diameter of the bowl body is gradually narrowed from top to bottom.

According to the technical solutions in the examples of the present disclosure, the diameter of the bowl body is gradually narrowed from top to bottom, the massage area that protrudes into the bowl body progressively converges from the top of the bowl body to the bottom of the bowl body, and the massage area closer to the bottom of the bowl body receives an increasing compressive force from an inner wall of the bowl body and an increasing compressive force from the clamping-kneading member, such that a stimulation effect of the clamping-kneading ends on the massage area is gradually enhanced from far to near, thereby improving the massage effect.

In some examples, the clamping-kneading massage structure further includes an elastic member; and the elastic member envelopes edges of the opening of the bowl body.

According to the technical solutions in the examples of the present disclosure, the bowl body, through the elastic member, is in contact with skin in the massage area, and the elastic member is flexible, which enhances comfort of the skin fitted with the opening of the bowl body and improves sealing adaptability of the skin in the massage area to the opening of the bowl body according to deformation of the skin in the massage area.

In some examples, the opening of the bowl body includes a plurality of opening segments that are connected end to end; and the opening segments protrude towards the massage area.

According to the technical solutions in the examples of the present disclosure, shapes formed by a plurality of protruding opening segments are identical or different, and the plurality of opening segments protrude toward the massage area in a regular manner to form shapes of lip, petal or even palm, which provides the user with a good enveloping experience and an appealing visual experience.

In some examples of the present disclosure, the clamping-kneading massage structure further includes a drive assembly, and the drive assembly is configured to drive the clamping-kneading member to rotate; an end of the clamping-kneading member away from the clamping-kneading end is a movable end, and the movable end is provided with a first pushing opening; the first pushing opening extends in a length direction of the clamping-kneading member; the clamping-kneading member rotates pivotally around its central axis; the drive assembly includes a drive member and a movable member; the drive member drives the movable member to achieve vertical movement in a height direction of the bowl body; the movable member is provided with a first pushing portion that extends into the first pushing opening; and the first pushing portion is in sliding fit with the first pushing opening.

According to the technical solutions in the examples of the present disclosure, the movable end is provided with a first pushing opening; the first pushing opening extends in a length direction of the clamping-kneading member; the movable member is provided with a first pushing portion that extends into the first pushing opening; as the clamping-kneading member rotates pivotally around its central axis, a movement path of the first pushing opening when the clamping-kneading members rotate is actually curved, and the first pushing portion is in sliding fit with the first pushing opening, such that the movable member drives the two clamping-kneading members to rotate in opposite directions through vertical movement thereof, when the movable member moves towards the bowl body, the clamping-kneading ends of the two clamping-kneading members move apart from each other, and when the movable member moves away from the bowl body, the clamping-kneading ends of the two clamping-kneading members move closer to each other. Movement of the movable member ensures that rotation angles and rates of the two clamping-kneading member are identical, such that the massage area located between the clamping-kneading ends of the two clamping-kneading members receives equal acting forces from the two clamping-kneading ends. Additionally, a movement path of the clamping-kneading ends when the clamping-kneading members rotate is also curved actually, such that directions of acting forces applied by the clamping-kneading ends on the massage area change continuously as the clamping-kneading members rotate.

In some examples, the drive assembly further includes a top plate, a bottom plate, and at least a guide shaft. The guide shaft is connected to the top plate and the bottom plate; the guide shaft extends in the height direction of the bowl body; the movable member is located between the top plate and the bottom plate; and the movable member is provided with a through hole for the guide shaft to penetrate through.

According to the technical solutions in the examples of the present disclosure, the guide shaft extends in the height direction of the bowl body; and the movable member is located between the top plate and the bottom plate; the through hole in the movable member is sleeved over the guide shaft, and the guide shaft restricts a lifting direction of the movable member, such that the movable member stably drives the clamping-kneading members to rotate so as to clamp and knead the massage area.

In some examples, the movable member is provided with a second pushing opening; the second pushing opening extends in the width direction of the bowl body; the drive assembly further includes a conversion member; the conversion member axially rotates in a thickness direction of the bowl body; a second pushing portion and a first transmission portion are arranged at axially opposite ends of the conversion member; the second pushing portion is offset from a central axis of the conversion member; the first transmission portion is co-axial with the conversion member; the second pushing portion extends into the second pushing opening, and the second pushing portion is in sliding fit with the second pushing opening; the drive member drives the conversion member to rotate through the first transmission portion; and the conversion member rotates to drive vertical movement of a movable portion through the second pushing portion.

According to the technical solutions in the examples of the present disclosure, the drive member drives the conversion member to rotate through the first transmission portion, the second pushing portion extends into the second pushing opening and is in sliding fit with the second pushing opening, and when the conversion member rotates, the second pushing opening moves in the second pushing opening in the width direction of the bowl body in a reciprocating manner, such that the movable portion is driven to achieve vertical movement in the height direction of the bowl body in a reciprocating manner, with a simple structure and a stable and reliable effect; and a rotational diameter of the second pushing opening limits a movement distance of the movable member, which further limits distance between the two massage heads when moving closer to or further apart from each other, which ensures that the massage area is clamped and kneaded, and prevents injury of the user caused by excessive compression of the massage area by the clamping-kneading ends.

In some examples, the drive assembly further includes a first transmission member, and the first transmission member is arranged at an output end of the drive member; the drive member drives the first transmission member to axially rotate in the height direction of the bowl body; and both the first transmission portion and the first transmission member are bevel gears that are meshed with each other.

According to the technical solutions in the examples of the present disclosure, the drive member drives the first transmission member to axially rotate in the height direction of the bowl body; and both the first transmission portion and the first transmission member are bevel gears that are meshed with each other, cooperation of the first transmission portion and the first transmission member enables that a rotating shaft at the output end of the drive member (i.e., a rotating motor) is parallel to an axial direction of the bowl body, such that the clamping-kneading massage structure provided in the present disclosure is an overall strip structure that in the height direction of the bowl body, and the clamping-kneading massage structure provided in the present disclosure extends into a relatively narrow space to massage the massage area.

In a second aspect, a massager is provided in the present disclosure, the massager includes the clamping-kneading massage structure mentioned in the first aspect and a housing, and the clamping-kneading members excluding the clamping-kneading ends are located inside the housing; and the clamping-kneading members are hinged to the housing.

According to the technical solutions in the examples of the present disclosure, the clamping-kneading members excluding the clamping-kneading ends are inside the housing, and the housing separates parts of the clamping-kneading members excluding the clamping-kneading ends from an external environment, thereby ensuring stable operation; and the clamping-kneading members are hinged to the housing, providing a stable rotational pivot for the clamping-kneading members.

In some examples, an air control assembly is further included; the air control assembly is inside the housing; the air control assembly is communicated with an internal space of the bowl body; and the air control assembly is configured to alternately blow or suck air against the skin in the massage area through the bowl body to apply positive or negative pressure.

According to the technical solutions in the examples of the present disclosure, the air control assembly is configured to alternately blow or suck air against the skin in the massage area through the bowl body to apply positive or negative pressure, the air control assembly first sucks air against the skin in the massage area through the bowl body to apply negative pressure before clamping-kneading massage, such that the massage area protrudes into the bowl body, and after the massage area converges inside the bowl body, the massage heads begin to clamp and knead the massage area; and when the two massage heads clamp the massage area, the air control assembly blows air against the skin in the massage area through the bowl body to apply positive pressure, and portions inside the bowl body excluding the massage area clamped by the massage heads are pressed and deformed toward the outer side of the bowl body, such that the massage area clamped by the massage heads is pulled, thereby enhancing the massage effect and user experience.

In some examples, the housing includes an inner shell and an outer shell; the inner shell is located inside the outer shell, and the inner shell is closely fitted with the outer shell; the inner shell supports the outer shell; and the inner shell is harder than the outer shell.

According to the technical solutions in the examples of the present disclosure, the inner shell is harder than the outer shell, such that the outer shell is supported by the harder inner shell when deforming and fitting with the user's skin, to maintain an overall shape of the massager provided in the present disclosure, which enhances overall stability of the massager and optimizes user experience.

In some examples, the inner shell includes a first sub-shell and a second sub-shell; and the first sub-shell and the second sub-shell are detachably connected.

According to the technical solutions in the examples of the present disclosure, the split-type inner shell is located inside the outer shell, to prevent the first sub-shell and the second sub-shell from separating from each other, which enhances overall stability of the housing; and the first sub-shell and the second sub-shell are detachably connected, to facilitate assembly and disassembly and maintenance of components inside the inner shell.

In some examples, the bowl body is detachably connected to the housing.

According to the technical solutions in the examples of the present disclosure, the bowl body is detachably connected to the housing, which, on the one hand, facilitates cleaning or maintenance of the bowl body after disassembly thereof, and reduces difficulty of cleaning or maintaining the clamping-kneading massage structure; and on the other hand, the user is allowed to replace a bowl body that matches the massage area in shape and size or chooses not to use the bowl body, thereby meeting diverse massage needs.

In some examples, a plurality of bowl bodies are further included, and openings of the plurality of bowl bodies are different in sizes and shapes.

According to the technical solutions in the examples of the present disclosure, users easily select and replace bowl bodies of corresponding sizes and shapes according to use needs, thereby expanding the application scope of the massager provided in the present disclosure.

Additional aspects and advantages of the present disclosure will be set forth partially in the following description, which will become obvious in the following description, or may be learned by practice of the present disclosure.

BRIEF DESCRIPTION OF THE DRAWINGS

To describe the technical solution in the examples of the present disclosure more clearly, the accompanying drawings required for describing the examples are briefly described below. It is to be understood that the following accompanying drawings show merely some examples of the present disclosure, and therefore it is not to be construed as a limitation to the scope. Those of ordinary skill in the art may also derive other accompanying drawings from these accompanying drawings without making inventive efforts.

Figure 1:
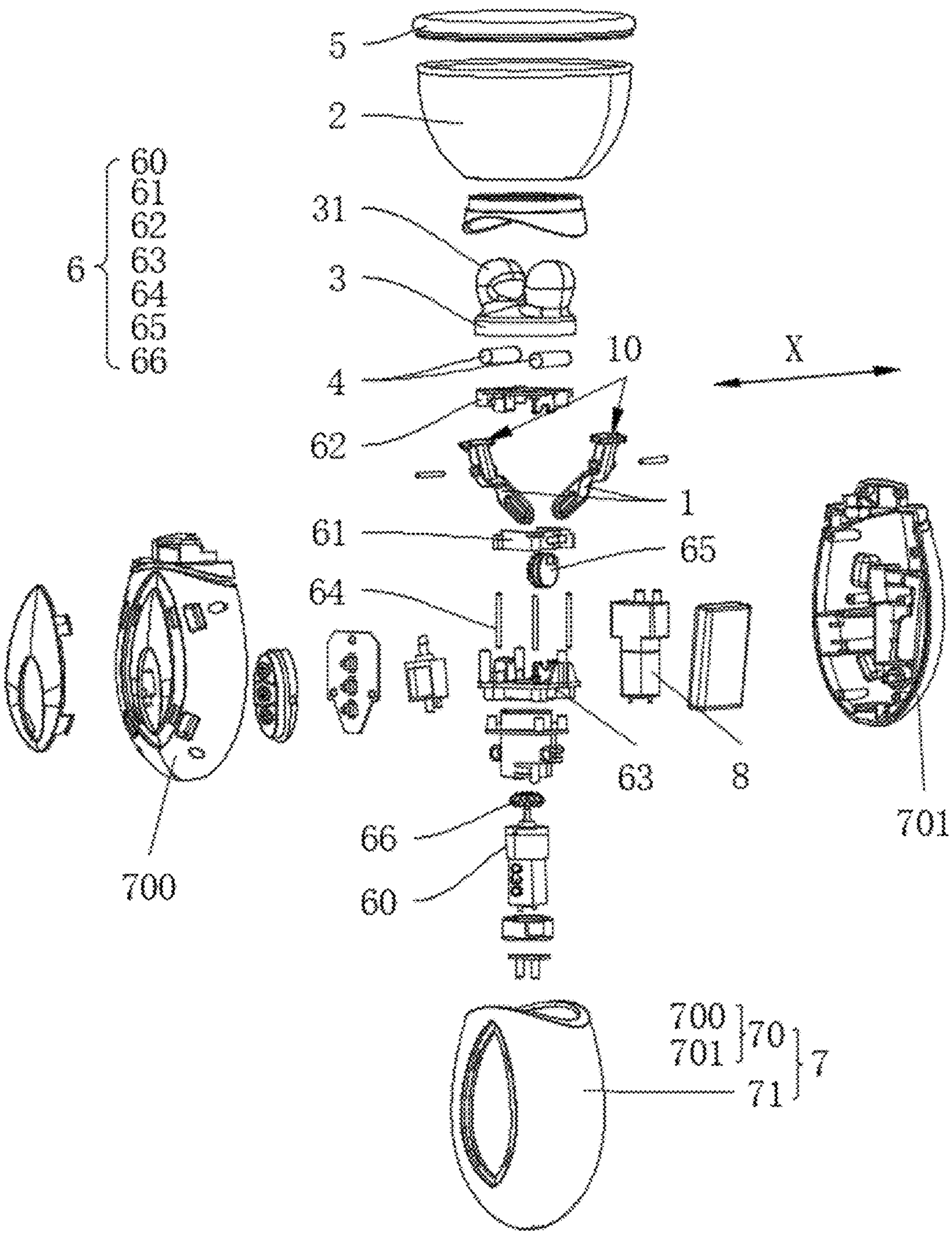
FIG. 1 is an exploded view of a massager provided in some examples of the present disclosure.

Reference numerals: 1—clamping—kneading member; 10—clamping—kneading end; 11—movable end; 110—first pushing opening; 2—bowl body; 3—flexible massage sleeve; 30—deformation cavity; 300—first cavity segment; 301—second cavity segment; 302—third cavity segment; 31—massage head; 4—vibration element; 5—elastic member; 6—drive assembly; 60—drive member; 61—movable member; 610—first pushing portion; 611—second pushing opening; 62—top plate; 63—bottom plate; 64—guide shaft; 65—conversion member; 650—second pushing portion; 651—first transmission portion; 66—first transmission member; 7—housing; 70—inner shell; 700—first sub—shell; 701—second sub—shell; 71—outer shell; 8—air control assembly; and X—first direction.

DETAILED DESCRIPTIONS OF THE EMBODIMENTS

In order to make the objectives, technical solutions and advantages of the examples of the present disclosure clearer, the technical solutions in the examples of the present disclosure will be clearly and completely described below in combination with the accompanying drawings in the examples of the present disclosure. Apparently, the examples described are merely some rather than all of the examples of the present disclosure. Based on the examples of the present disclosure, all other examples acquired by those of ordinary skill in the art without making creative efforts fall within the scope of protection of the present disclosure.

Unless defined otherwise, all technical and scientific terms used herein have the same meanings as commonly understood by those skilled in the art to which the present disclosure belongs. The terms used in the specification of the present disclosure are for the purpose of describing specific examples merely and are not intended to limit the present disclosure. The terms "including" and "having", and any variations thereof in the specification, the claims and the above accompanying drawings are intended to cover non-exclusive inclusion. The terms "first", "second" and the like in the specification and the claims or the above accompanying drawings are used to distinguish different objects and are not intended to indicate a specific order or hierarchical relationship.

When the term "example" is referred to herein, it means that specific features, structures or characteristics described in combination with the example are included in at least one example of the present disclosure. When this phrase occurs at various positions in the specification, it neither necessarily refers to the same embodiment, nor refers to an independent or alternative embodiment mutually exclusive to other embodiments. Those skilled in the art understand both explicitly and implicitly that the examples described herein can be combined with other examples.

In the description of the present disclosure, it is to be noted that, unless otherwise explicitly specified and defined, the terms "mounting", "connected", "connecting" and "attaching" and orientation terms "inner", "outer", "horizontal", "central", "longitudinal", "lateral" and "vertical" are to be understood in a broad sense, for example, they may be a fixed connection, a detachable connection, or an integrated connection; and may be a direct connection, or an indirect connection via an intermediate medium, or communication inside two elements. For those of ordinary skill in the art, the specific meanings of the above terms in the present disclosure may be understood according to specific circumstances.

The term "and/or" in the present disclosure, which is merely an association relation describing an associated object, means that there maybe exist three relations, for example, A and/or B maybe represent three situations: A exists alone, A and B exist at the same time, and B exists alone. In addition, the character "/" mentioned in the present disclosure generally indicates that the associated objects are in an "or" relationship.

The term "a plurality of" used in the present disclosure refers to two or more (including two), and similarly, "a plurality of groups" refers to two or more groups (including two groups), and "a plurality of sheets" refers to two or more sheets (including two sheets).

Figure 2:
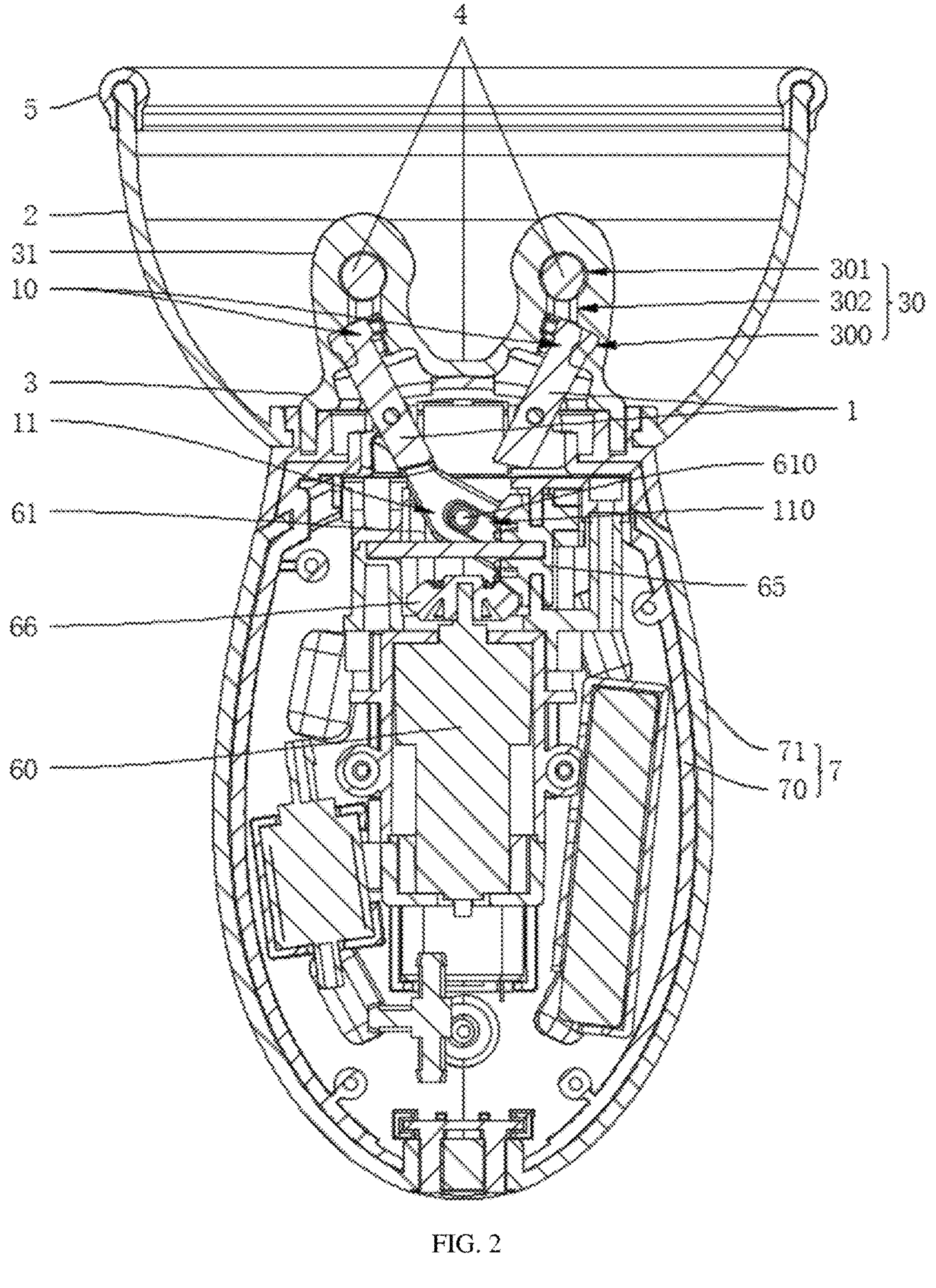
FIG. 2 is a sectional view of FIG. 10 in an A-A direction.
Figure 3:
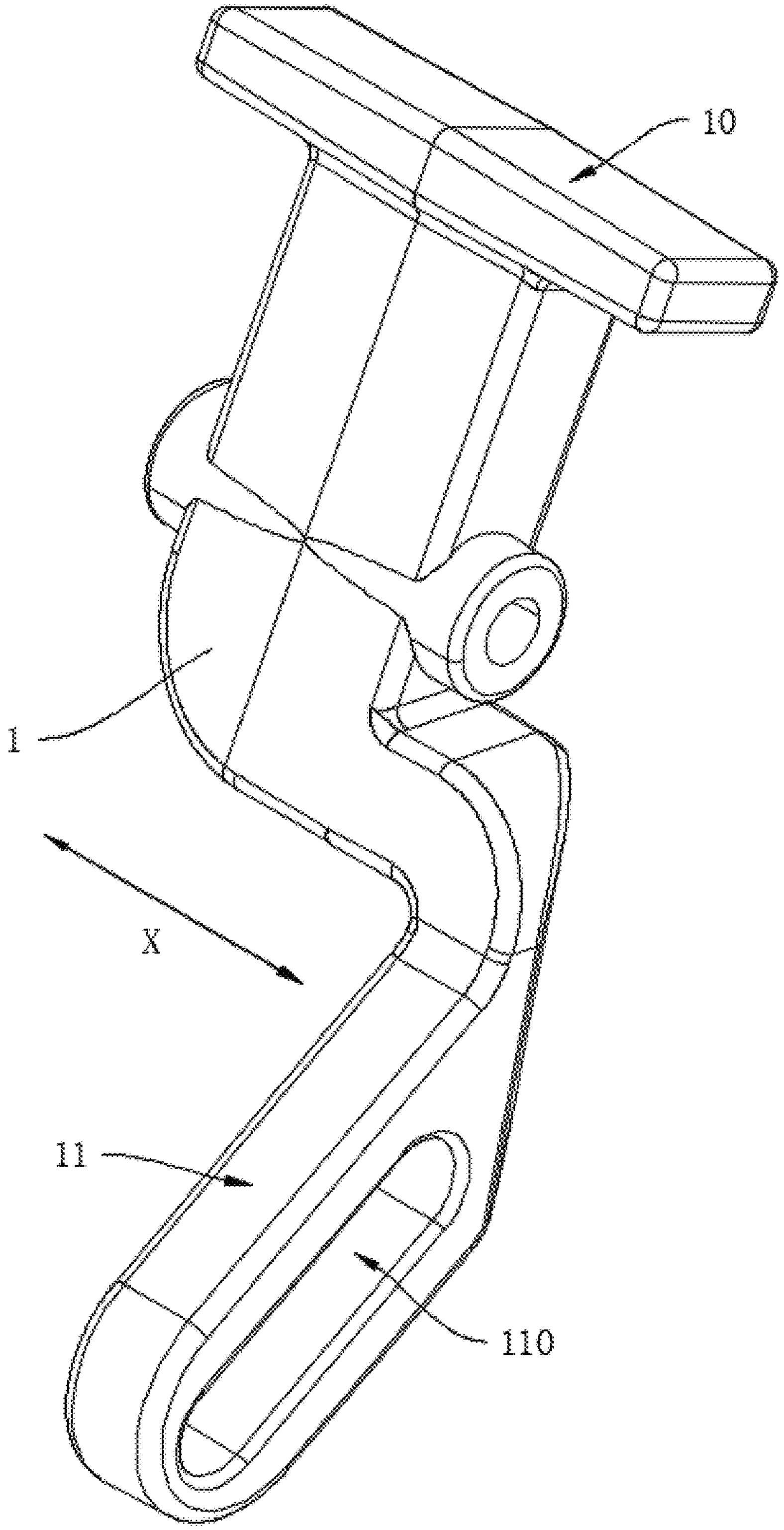
FIG. 3 is a structural schematic diagram of a clamping-kneading member in some examples of the present disclosure.

According to some examples of the present disclosure, optionally, as shown in FIGS. 1-3, a clamping-kneading massage structure is provided in the present disclosure, and the clamping-kneading massage structure includes two massage heads 31, clamping-kneading members 1, and a bowl body 2, where the massage heads 31 are configured for contact with a massage area; either of the clamping-kneading members 1 includes a clamping-kneading end 10 for clamping and kneading a massage area; the clamping-kneading end 10 of the clamping-kneading member 1 extends into at least one of the two massage heads 31; the clamping-kneading member 1 is configured to rotate in a first direction X, and the first direction X is perpendicular to a connection line between the two massage heads 31; rotation of the clamping-kneading member 1 causes one of the two massage heads 31 to move closer to or further away from the other; the two massage heads 31 move closer to each other to squeeze a massage area, and the two massage heads 31 move apart from each other to release the massage area; the bowl body 2 is provided with an opening that fits skin in a massage area; and the massage heads 31 are located inside the bowl body 2.

The opening of the bowl body 2 is optionally arranged above the massage heads 31.

The bowl body 2 is optionally made from a skin-friendly transparent material, such as rubber, plastic, resin or the like.

The opening of the bowl body 2 is not specifically limited in shape, which is elliptical, circular, rectangular, polygonal, or the like. However, in practical applications, because human skin is delicate and rectangular and polygonal shapes have right-angled edges, right-angled edges thereof, in case of contact with a body part, exert pressure on skin of a massage area, thereby easily leading to skin injury. Therefore, the opening of the bowl body 2 is typically elliptical or circular, but it does not mean that the opening of the bowl body 2 is only elliptical or circular, and the opening of the bowl body 2 is alternatively arranged to be rectangular, polygonal or the like when right-angled edges of a rectangular or polygonal shape are rounded.

The first direction X refers to a central axis around which the clamping-kneading member 1 rotates.

When two clamping-kneading members 1 are provided, the two clamping-kneading members 1 rotates in an opposite direction.

The two clamping-kneading members 1 referred to in the present disclosure rotates reversely, that is, rotation directions of the two clamping-kneading members 1 are opposite.

The clamping-kneading end 10 is optionally arranged inside only one of the two massage heads 31 referred to in the present disclosure. For illustrative purposes of the present disclosure, an example in which the clamping-kneading ends 10 of the two clamping-kneading members 1 extend into the two massage heads 31 respectively is described.

In a width direction of the bowl body 2, acting forces exerted on a massage area by the two clamping-kneading members 1 offset each other, such that the acting forces exerted on the massage area by the two clamping-kneading members 1 are equal.

The massage heads 31 are configured for contact with a massage area; either of the clamping-kneading members 1 includes a clamping-kneading end 10 for clamping and kneading a massage area; the clamping-kneading end 10 of the clamping-kneading member 1 extends into at least one of the two massage heads 31; the clamping-kneading member 1 is configured to rotate in a first direction X, and the first direction X is perpendicular to a connection line between the two massage heads 31; and rotation of the clamping-kneading member 1 causes one of the two massage heads 31 to move closer to or further away from the other, and the two massage heads 31, driven by the clamping-kneading ends 10, alternately move closer to or further away from each other to perform repeated clamping-kneading massages on a massage area. When the clamping-kneading members 1 rotate to squeeze a massage area, part of the massage area between the two massage heads 31 is clamped and squeezed by the clamping-kneading ends 10, the massage heads 31 drive other areas around the massage area to deform in a direction away from the massage heads 31, the massage heads 31 are located inside the bowl body 2, and the bowl body 2 is capable of preventing the massage area fitted therewith from deforming in a direction away from the massage heads 31, such that the clamping-kneading ends 10 continuously and stably stimulate a user through clamping-kneading the massage area; a massager provided with the clamping-kneading massage structure of the present disclosure pushes and squeezes skin and flesh around a massage area into the bowl body 2 before massaging, such that the massage area further protrudes into inside of the bowl body 2, which not only enables the clamping-kneading member 1 to stimulate more body parts of the user during movement, but also increases a compressive force between the clamping-kneading end 10 and the massage area and enhances an effect of massaging the massage area; and the clamping-kneading massage structure provided by the present disclosure enables focused and deep massage of the massage area, having better massage and stimulation effects.

Take an effect of massaging the user's breast as an example. When the clamping-kneading massage structure provided by the present disclosure massages the user's breast, opposite faces of the two massage heads 31 compress the user's nipple and mammary gland while pressing the breast. The clamping-kneading massage structure enables to massage other parts of the breast (e.g., a part corresponding to the mammary gland) while focusing on the nipple, which effectively alleviates symptoms of the user's breast and other body parts such as poor blood circulation and mammary duct obstruction.

Figure 4:
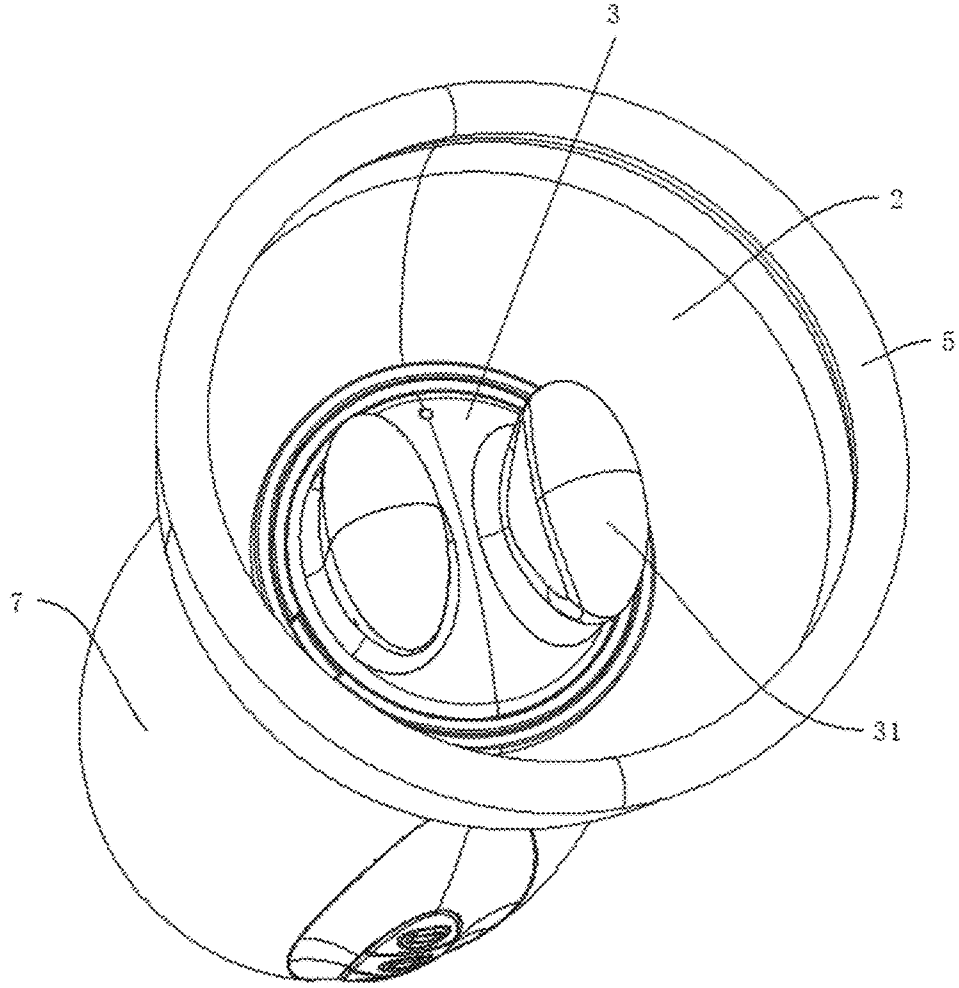
FIG. 4 is a schematic diagram of an external structure of a massager provided in some examples of the present disclosure.
Figure 5:
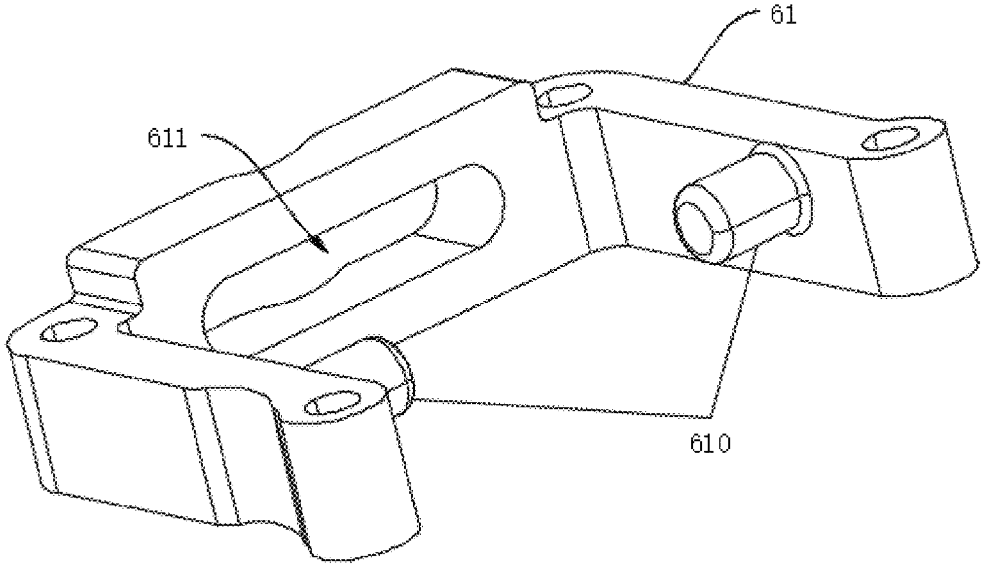
FIG. 5 is a structural schematic diagram of a movable member provided in some examples of the present disclosure.
Figure 6:
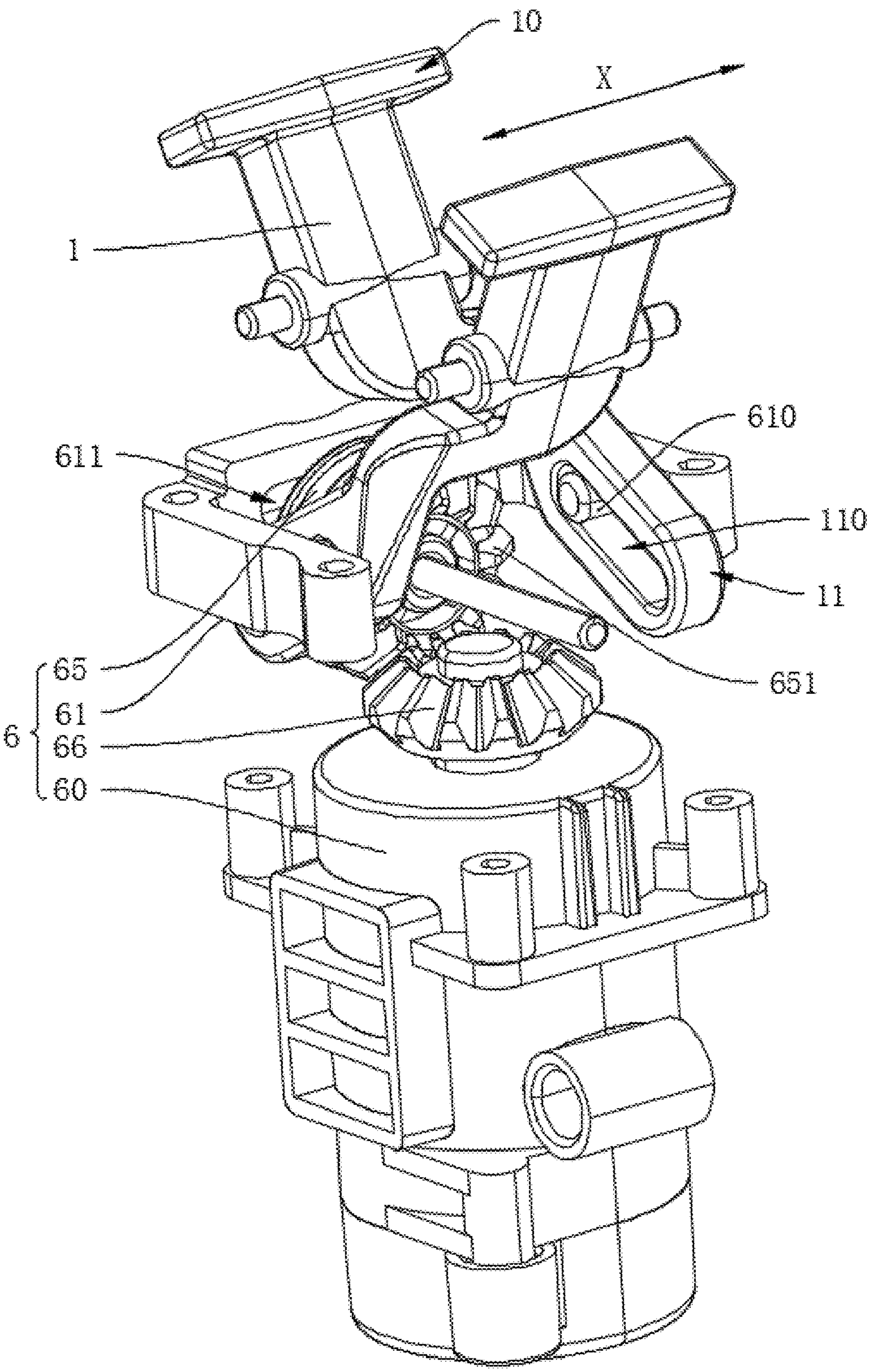
FIG. 6 is a structural schematic diagram of a drive assembly and a clamping-kneading member provided in some examples of the present disclosure.
Figure 7:
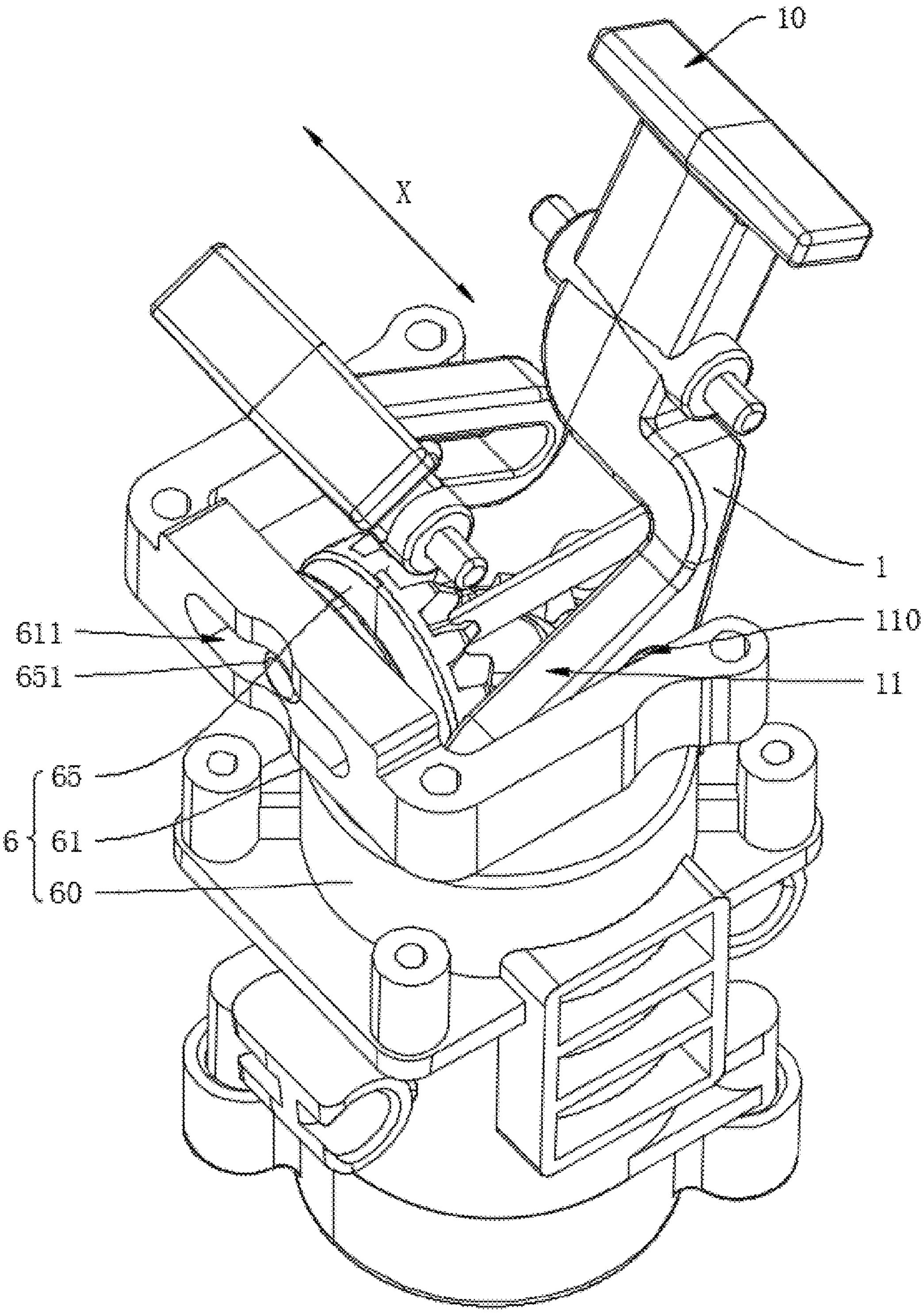
FIG. 7 is a structural schematic diagram of a drive assembly and a clamping-kneading member provided in some other examples of the present disclosure.

According to some examples of the present disclosure, optionally, as shown in FIGS. 1, 2 and 4, the clamping-kneading massage structure further includes a flexible massage sleeve 3; the flexible massage sleeve 3 is at least partially located inside the bowl body 2; and the flexible massage sleeve 3 includes the massage heads 31, and the clamping-kneading ends 10 are in contact with a massage area through the massage heads 31.

The opening of the bowl body 2 is optionally arranged above the flexible massage sleeve 3.

The flexible massage sleeve 3 is optionally made from a skin-friendly flexible material, such as rubber, resin or the like.

A plurality of irregular protrusions or depressions are arranged on a surface of the flexible massage sleeve 3 in contact with the massage area; and a portion of the flexible massage sleeve 3 enveloping the clamping-kneading ends 10 is optionally thicker than other portions thereof, which enhances a cushioning effect between the clamping-kneading end 10 and the massage area, and reduces the risk of injury to the massage area caused by a clamping, kneading or squeezing action of the clamping-kneading member 1.

The flexible massage sleeve 3 envelopes the clamping-kneading ends 10, and the clamping-kneading ends 10 are in contact with the massage area through the flexible massage sleeve 3; on the one hand, the flexible massage sleeve 3 deforms depending on a shape of the massage area, which increases an area where the flexible massage sleeve is fitted with the massage area, and ensures that all parts of the massage area receive a compressive force from the clamping-kneading ends 10; and on the other hand, the flexible massage sleeve 3 protects skin in the massage area from potential injuries caused by repeated friction by the clamping-kneading ends 10.

The flexible massage sleeve 3 seals an opening of the bowl body 2 away from the massage area, an enclosed space is formed when the bowl body 2 is fitted with the skin in the massage area, and air inside the bowl body 2 is partially expelled during deformation of the massage area when the bowl body 2 is fitted with the massage area, such that an inner air pressure of the space formed between the bowl body 2 and the massage area is lower than an atmospheric pressure, and the bowl body 2 has a certain adsorption effect on the massage area.

According to some examples of the present disclosure, optionally, as shown in FIGS. 1 and 2, the clamping-kneading massage structure further includes a vibration element 4; the vibration element 4 is arranged between the clamping-kneading end 10 and the flexible massage sleeve 3; and the vibration element 4 is configured to vibrate an area where the flexible massage sleeve 3 is in contact with the massage area.

The vibration element 4 is optionally a vibration motor.

The vibration element 4 is arranged between the clamping-kneading end 10 and the flexible massage sleeve 3, which enhances a driving effect of the clamping-kneading ends 10 on the vibration element 4, and ensures the vibration element 4 follows the clamping-kneading ends 10 to timely squeeze or release the massage area; and the vibration element 4 is configured to vibrate an area where the flexible massage sleeve 3 is in contact with the massage area, and the flexible massage sleeve 3 prevents the vibration element 4 from direct contact with the massage area.

According to some examples of the present disclosure, optionally, as shown in FIG. 2, the massage head 31 is internally provided with a deformation cavity 30; the deformation cavity 30 includes a first cavity segment 300, a second cavity segment 301, and a third cavity segment 302; the clamping-kneading ends 10 are located in the first cavity segment 300; the vibration element 4 is located in the second cavity segment 301; the third cavity segment 302 is communicated with the first cavity segment 300 and the second cavity segment 301; an inner wall of the third cavity segment 302 is thicker than an inner wall of the second cavity segment 301; the clamping-kneading ends 10 of the clamping-kneading member 1 move closer to or further away from each other to narrow or amplify a diameter of the third cavity segment 302; the inner wall of the second cavity segment 301 abuts against the vibration element 4 to push the vibration element 4 into the third cavity segment 302; and the diameter of the third cavity segment 302 is narrowed to push the vibration element 4 back into the second cavity segment 301.

The third cavity segment 302 of the deformation cavity 30 is communicated with the first cavity segment 300 and the second cavity segment 301, the inner wall of the third cavity segment 302 is thicker than the inner wall of the second cavity segment 301, the flexible massage sleeve 3 absorbs kinetic energy of the vibration element 4 through inherent flexibility, and therefore, when the flexible massage sleeve 3 enveloping the vibration element 4 gets thicker, an effect of absorbing the kinetic energy of the vibration element 4 is better; the vibration element 4 moves between the third cavity segment 302 with a thicker inner wall and the second cavity segment 301 with a thinner inner wall in a reciprocating manner, that is, when the two massage heads 31 move closer to each other, the vibration element 4 is gradually pushed into the second cavity segment 301 from the third cavity segment 302, and kinetic energy of the vibration element 4 absorbed by an inner wall of the flexible massage sleeve 3 is gradually reduced, such that a vibration stimulation effect of the vibration element 4 on the massage area is enhanced with an increase in a clamping-kneading force from the clamping-kneading ends 10; and when the two massage heads 31 move apart from each other, the vibration element 4 is gradually pushed into the third cavity segment 302 from the inner wall of the second cavity segment 301, and kinetic energy of the vibration element 4 absorbed by the inner wall of the flexible massage sleeve 3 is gradually increased, such that the vibration stimulation effect of the vibration element 4 on the massage area is weakened with an decrease in a clamping-kneading force from the clamping-kneading ends 10. The clamping-kneading massage structure provided in the present disclosure synchronously enhances and weakens effects of vibration stimulation and clamping-kneading stimulation with movement of the vibration element 4, thereby optimizing user experience.

According to some examples of the present disclosure, optionally, as shown in FIGS. 1 and 2, a diameter of the bowl body 2 is gradually narrowed from top to bottom.

An opening where the bowl body 2 is fitted with skin in the massage area is formed at a top of the bowl body 2, and an end of the bowl body 2 away from the massage area is arranged at a bottom of the bowl body 2.

The diameter of the bowl body 2 is gradually narrowed from top to bottom, the massage area that protrudes into the bowl body 2 progressively converges from the top of the bowl body 2 to the bottom of the bowl body 2, and the massage area closer to the bottom of the bowl body 2 receives an increasing compressive force from an inner wall of the bowl body 2 and an increasing compressive force from the clamping-kneading member 1, such that a stimulation effect of the clamping-kneading ends 10 on the massage area is gradually enhanced from far to near, thereby improving the massage effect.

According to some examples of the present disclosure, optionally, as shown in FIGS. 1, 2 and 4, the clamping-kneading massage structure further includes an elastic member 5; and the elastic member 5 envelopes edges of the opening of the bowl body 2.

The elastic member 5 is optionally made from a skin-friendly flexible silicone material.

The elastic member 5 continuously envelopes the opening of the bowl body 2.

The bowl body 2, through the elastic member 5, is in contact with skin in the massage area, and the elastic member 5 is flexible, which enhances comfort of the skin fitted with the opening of the bowl body 2 and improves sealing adaptability of the skin in the massage area to the opening of the bowl body 2 according to deformation of the skin in the massage area.

According to some examples of the present disclosure, the opening of the bowl body 2 includes a plurality of opening segments that are connected end to end; and the opening segments protrude towards the massage area.

The number of the opening segments is two, three, four, five, six, seven, eight, or more.

Shapes formed by a plurality of protruding opening segments are identical or different, and the plurality of opening segments protrude toward the massage area in a regular manner to form shapes of lip, petal or even palm, which provides the user with a good enveloping experience and an appealing visual experience.

According to some examples of the present disclosure, optionally, as shown in FIGS. 1-3 and 5-8, the clamping-kneading massage structure further includes a drive assembly 6, and the drive assembly 6 is configured to drive the clamping-kneading member 1 to rotate; an end of the clamping-kneading member 1 away from the clamping-kneading end 10 is a movable end 11, and the movable end 11 is provided with a first pushing opening 110; the first pushing opening 110 extends in a length direction of the clamping-kneading member 1; the clamping-kneading member 1 rotates pivotally around its central axis; the drive assembly 6 includes a drive member 60 and a movable member 61; the drive member 60 drives the movable member 61 to achieve vertical movement in a height direction of the bowl body 2; the movable member 61 is provided with a first pushing portion 610 that extends into the first pushing opening 110; and the first pushing portion 610 is in sliding fit with the first pushing opening 110.

The clamping-kneading end 10 and the movable end 11 are two opposite ends of the clamping-kneading member 1.

The movable end 11 is optionally located outside the bowl body 2 such that the drive assembly 6 easily drives the clamping-kneading member 1 to rotate.

In a width direction of the bowl body 2, the first pushing portion 610 is located between central axes of the two clamping-kneading members 1.

The movable end 11 is provided with a first pushing opening 110; the first pushing opening 110 extends in a length direction of the clamping-kneading member 1; the movable member 61 is provided with a first pushing portion 610 that extends into the first pushing opening 110; as the clamping-kneading member 1 rotates pivotally around its central axis, a movement path of the first pushing opening 110 when the clamping-kneading members 1 rotate is actually curved, and the first pushing portion 610 is in sliding fit with the first pushing opening 110, such that the movable member 61 drives the two clamping-kneading members 1 to rotate in opposite directions through vertical movement thereof, when the movable member 61 moves towards the bowl body 2, the clamping-kneading ends 10 of the two clamping-kneading members 1 move apart from each other, and when the movable member 61 moves away from the bowl body 2, the clamping-kneading ends 10 of the two clamping-kneading members 1 move closer to each other. Movement of the movable member 61 ensures that rotation angles and rates of the two clamping-kneading member 1 are identical, such that the massage area located between the clamping-kneading ends 10 of the two clamping-kneading members 1 receives equal acting forces from the two clamping-kneading ends 10. Additionally, a movement path of the clamping-kneading ends 10 when the clamping-kneading members 1 rotate is also curved actually, such that directions of acting forces applied by the clamping-kneading ends 10 on the massage area change continuously as the clamping-kneading members 1 rotate.

Figure 8:
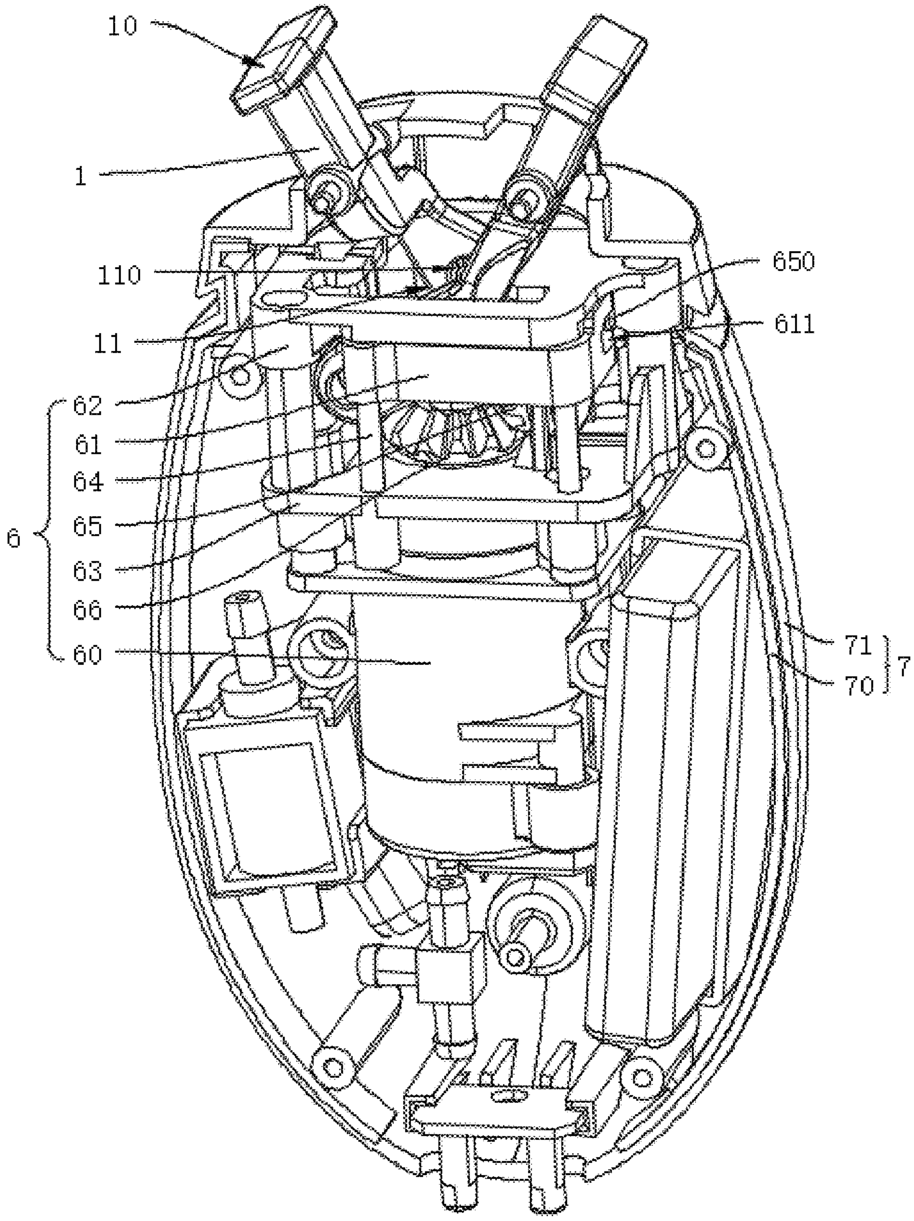
FIG. 8 is a schematic diagram of an internal structure of a massager provided in some examples of the present disclosure.
Figure 9:
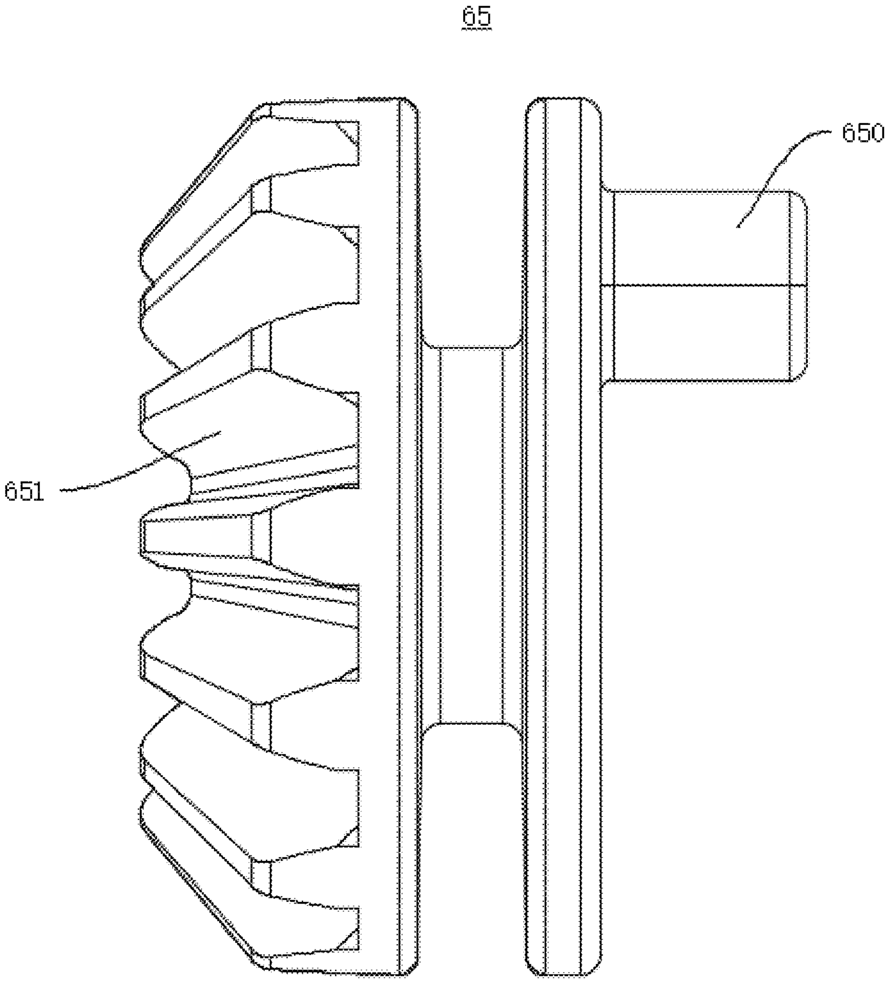
FIG. 9 is a structural schematic diagram of a conversion member provided in some examples of the present disclosure.

According to some examples of the present disclosure, optionally, as shown in FIGS. 1 and 8, the drive assembly 6 further includes a top plate 62, a bottom plate 63, and at least a guide shaft 64. The guide shaft 64 is connected to the top plate 62 and the bottom plate 63; the guide shaft 64 extends in the height direction of the bowl body 2; the movable member 61 is located between the top plate 62 and the bottom plate 63; and the movable member 61 is provided with a through hole for the guide shaft 64 to penetrate through.

The number of the guide shafts 64 is one, two, three, four, five, six, seven, eight, or more.

Shapes of the top plate 62 and the bottom plate 63 that face a surface of the movable member 61 optionally match a shape of the movable member 61.

The guide shaft 64 extends in the height direction of the bowl body 2; and the movable member 61 is located between the top plate 62 and the bottom plate 63; the through hole in the movable member 61 is sleeved over the guide shaft 64, and the guide shaft 64 restricts a lifting direction of the movable member 61,such that the movable member 61 stably drives the clamping-kneading members 1 to rotate so as to clamp and knead the massage area.

According to some examples of the present disclosure, optionally, as shown in FIGS. 5-9, the movable member 61 is provided with a second pushing opening 611; the second pushing opening 611 extends in the width direction of the bowl body 2; the drive assembly 6 further includes a conversion member 65; the conversion member 65 axially rotates in a thickness direction of the bowl body 2; a second pushing portion 650 and a first transmission portion 651 are arranged at axially opposite ends of the conversion member 65; the second pushing portion 650 is offset from a central axis of the conversion member 65; the first transmission portion 651 is co-axial with the conversion member 65; the second pushing portion 650 extends into the second pushing opening 611, and the second pushing portion 650 is in sliding fit with the second pushing opening 611; the drive member 60 drives the conversion member 65 to rotate through the first transmission portion 651; and the conversion member 65 rotates to drive vertical movement of a movable portion through the second pushing portion 650.

The width direction of the bowl body 2 is perpendicular to the thickness direction of the bowl body 2.

The drive member 60 drives the conversion member 65 to rotate through the first transmission portion 651, the second pushing portion 650 extends into the second pushing opening 611 and is in sliding fit with the second pushing opening 611, and when the conversion member 65 rotates, the second pushing opening 650 moves in the second pushing opening 611 in the width direction of the bowl body 2 in a reciprocating manner, such that the movable portion is driven to achieve vertical movement in the height direction of the bowl body 2 in a reciprocating manner, with a simple structure and a stable and reliable effect; and a rotational diameter of the second pushing opening 650 limits a movement distance of the movable member 61, which further limits distance between the two massage heads 31 when moving closer to or further apart from each other, which ensures that the massage area is clamped and kneaded, and prevents injury of the user caused by excessive compression of the massage area by the clamping-kneading ends 10.

According to some examples of the present disclosure, optionally, as shown in FIGS. 1-2 and 6-8, the drive assembly 6 further includes a first transmission member 66, and the first transmission member 66 is arranged at an output end of the drive member 60; the drive member 60 drives the first transmission member 66 to axially rotate in the height direction of the bowl body 2; and both the first transmission portion 651 and the first transmission member 66 are bevel gears that are meshed with each other.

Bevel gears (or conical gears) are commonly used gears for mechanical transmission, and are primarily used for transmitting a torque between two intersecting shafts, and the two shafts are mounted usually at an angle of 90°.

The drive member 60 drives the first transmission member 66 to axially rotate in the height direction of the bowl body 2; and both the first transmission portion 651 and the first transmission member 66 are bevel gears that are meshed with each other, cooperation of the first transmission portion 651 and the first transmission member 66 enables that a rotating shaft at the output end of the drive member 60 (i.e., a rotating motor) is parallel to an axial direction of the bowl body 2, such that the clamping-kneading massage structure provided in the present disclosure is an overall strip structure that in the height direction of the bowl body 2, and the clamping-kneading massage structure provided in the present disclosure extends into a relatively narrow space to massage the massage area.

Figure 10:
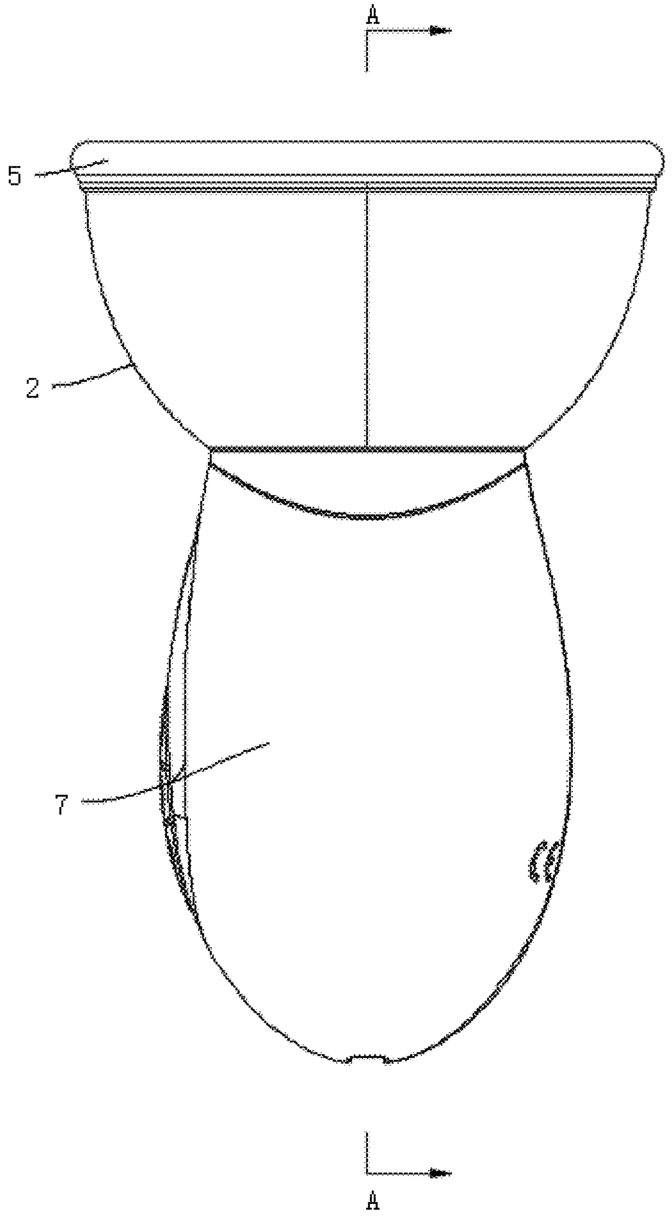
FIG. 10 is a side view of a massager provided in some examples of the present disclosure.

According to some examples of the present disclosure, optionally, as shown in FIGS. 1-2 and 10, a massager is provided in the present disclosure, the massager includes the above clamping-kneading massage structure and a housing 7, and the clamping-kneading members 1 excluding the clamping-kneading ends 10 are located inside the housing 7; and the clamping-kneading members 1 are hinged to the housing 7.

A battery and a charging structure are optionally further arranged inside the housing 7, the battery is electrically connected to a circuit system that controls rotation of the clamping-kneading members 1, the battery is electrically connected to the charging structure, the charging structure is optionally a PCBA circuit board or the like, and a charging port of the charging structure is arranged outside the housing 7.

The clamping-kneading members 1 are partially inside the housing 7, and the housing 7 separates parts of the clamping-kneading members 1 excluding the clamping-kneading ends 10 from an external environment, thereby ensuring stable operation; and the clamping-kneading members 1 are hinged to the housing 7, providing a stable rotational pivot for the clamping-kneading members 1.

According to some examples of the present disclosure, optionally, as shown in FIG. 1, an air control assembly 8 is further included; the air control assembly 8 is inside the housing 7; the air control assembly 8 is communicated with an internal space of the bowl body 2; and the air control assembly 8 is configured to alternately blow or suck air against the skin in the massage area through the bowl body 2 to apply positive or negative pressure.

A communication port between the air control assembly 8 and the bowl body 2 is optionally located at the bottom of the bowl body 2.

The air control assembly 8 is configured to alternately blow or suck air against the skin in the massage area through the bowl body 2 to apply positive or negative pressure, the air control assembly 8 first sucks air against the skin in the massage area through the bowl body 2 to apply negative pressure before clamping-kneading massage, such that the massage area protrudes into the bowl body 2, and after the massage area converges inside the bowl body 2, the massage heads 31 begin to clamp and knead the massage area; and when the two massage heads 31 clamp the massage area, the air control assembly 8 blows air against the skin in the massage area through the bowl body 2 to apply positive pressure, and portions inside the bowl body 2 excluding the massage area clamped by the massage heads 31 are pressed and deformed toward the outer side of the bowl body 2, such that the massage area clamped by the massage heads 31 is pulled, thereby enhancing the massage effect and user experience.

According to some examples of the present disclosure, optionally, as shown in FIGS. 1, 2 and 8, the housing 7 includes an inner shell 70 and an outer shell 71; the inner shell 70 is located inside the outer shell 71, and the inner shell 70 is closely fitted with the outer shell 71; the inner shell 70 supports the outer shell 71; and the inner shell 70 is harder than the outer shell 71.

The outer shell 71 is optionally made from a skin-friendly flexible material, such as silicone, resin or the like to enhance user comfort during skin contact.

The inner shell 70 is harder than the outer shell 71, such that the outer shell 71 is supported by the harder inner shell 70 when deforming and fitting with the user's skin, to maintain an overall shape of the massager provided in the present disclosure, which enhances overall stability of the massager and optimizes user experience.

According to some examples of the present disclosure, optionally, as shown in FIG. 1, the inner shell 70 includes a first sub-shell 700 and a second sub-shell 701; and the first sub-shell 700 and the second sub-shell 701 are detachably connected.

Overall shapes of the first sub-shell 700 and the second sub-shell 701 are optionally identical.

The first sub-shell 700 and the second sub-shell 701 are connected in a snap-fitted, screw-fastened, or partially nested manner.

The split-type inner shell 70 is located inside the outer shell 71, to prevent the first sub-shell 700 and the second sub-shell 701 from separating from each other, which enhances overall stability of the housing 7; and the first sub-shell 700 and the second sub-shell 701 are detachably connected, to facilitate assembly and disassembly and maintenance of components inside the inner shell 70.

According to some examples of the present disclosure, optionally, the bowl body 2 is detachably connected to the housing 7.

The bowl body 2 is detachably connected to the housing 7, which, on the one hand, facilitates cleaning or maintenance of the bowl body 2 after disassembly thereof, and reduces difficulty of cleaning or maintaining the clamping-kneading massage structure; and on the other hand, the user is allowed to replace a bowl body 2 that matches the massage area in shape and size or chooses not to use the bowl body 2, thereby meeting diverse massage needs.

According to some examples of the present disclosure, optionally, a plurality of bowl bodies 2 are further included, and openings of the plurality of bowl bodies 2 are different in sizes and shapes.

The present disclosure has been described with reference to preferred examples, but various modifications thereto may be made without departing from the scope of the present disclosure, and equivalents may be used to replace components therein. In particular, as long as there are no structural conflicts, various technical features mentioned in all examples may be combined in any manner. The present disclosure is not limited to specific examples disclosed herein but includes all technical solutions that fall within the scope of the claims.

What is claimed is:

1. A clamping-kneading massage structure, comprising:
- two massage heads, wherein the massage heads are configured for contact with a massage area;
- clamping-kneading members, wherein either of the clamping-kneading members comprises a clamping-kneading end for clamping and kneading the massage area;
- the clamping-kneading end of the clamping-kneading member extends into at least one of the two massage heads;
- the clamping-kneading member is configured to rotate in a first direction, such that one of the two massage heads moves closer to or further away from the other, and the first direction is perpendicular to a connection line between the two massage heads;
- a bowl body, being provided with an opening that fits skin in the massage area; and
- the massage heads are located inside the bowl body.

2. The clamping-kneading massage structure according to claim 1, further comprising a flexible massage sleeve;
- the flexible massage sleeve is at least partially located inside the bowl body; and
- the flexible massage sleeve includes the massage heads, and the clamping-kneading ends are in contact with the massage area through the massage heads.

3. The clamping-kneading massage structure according to claim 2, further comprising a vibration element;
- the vibration element is arranged between the clamping-kneading end and the flexible massage sleeve; and
- the vibration element is configured to vibrate an area where the flexible massage sleeve is in contact with the massage area.

4. The clamping-kneading massage structure according to claim 3, wherein the massage head is internally provided with a deformation cavity;
- the deformation cavity comprises a first cavity segment, a second cavity segment, and a third cavity segment;
- the clamping-kneading ends are located in the first cavity segment;
- the vibration element is located in the second cavity segment;
- the third cavity segment is communicated with the first cavity segment and the second cavity segment;
- an inner wall of the third cavity segment is thicker than an inner wall of the second cavity segment;
- the clamping-kneading ends of the clamping-kneading members move closer to or further away from each other to narrow or amplify a diameter of the third cavity segment;
- the inner wall of the second cavity segment abuts against the vibration element to push the vibration element into the third cavity segment; and
- the diameter of the third cavity segment is narrowed to push the vibration element back into the second cavity segment.

5. The clamping-kneading massage structure according to claim 1, wherein a diameter of the bowl body is gradually narrowed from top to bottom.

6. The clamping-kneading massage structure according to claim 1, further comprising an elastic member; and
- the elastic member envelopes edges of the opening of the bowl body.

7. The clamping-kneading massage structure according to claim 1, wherein the opening of the bowl body comprises a plurality of opening segments that are connected end to end; and
- the opening segments protrude towards the massage area.

8. The clamping-kneading massage structure according to claim 1, further comprising a drive assembly, wherein the drive assembly is configured to drive the clamping-kneading member to rotate;
- an end of the clamping-kneading member away from the clamping-kneading end is a movable end, and the movable end is provided with a first pushing opening;
- the first pushing opening extends in a length direction of the clamping-kneading member;
- the clamping-kneading member rotates pivotally around its central axis;
- the drive assembly comprises a drive member and a movable member;
- the drive member drives the movable member to achieve vertical movement in a height direction of the bowl body;
- the movable member is provided with a first pushing portion that extends into the first pushing opening;
- the first pushing portion is in sliding fit with the first pushing opening; and
- vertical movement of the movable member drives the clamping-kneading member to rotate.

9. The clamping-kneading massage structure according to claim 8, wherein the drive assembly further comprises:
- a top plate and a bottom plate;
- at least a guide shaft, being connected to the top plate and the bottom plate;
- the guide shaft extends in the height direction of the bowl body;
- the movable member is located between the top plate and the bottom plate; and
- the movable member is provided with a through hole for the guide shaft to penetrate through.

10. The clamping-kneading massage structure according to claim 8, wherein the movable member is provided with a second pushing opening;
- the second pushing opening extends in a width direction of the bowl body;
- the drive assembly further comprises a conversion member;
- the conversion member axially rotates in a thickness direction of the bowl body;

a second pushing portion and a first transmission portion are arranged at axially opposite ends of the conversion member;

the second pushing portion is offset from a central axis of the conversion member;

the first transmission portion is co-axial with the conversion member;

the second pushing portion extends into the second pushing opening, and the second pushing portion is in sliding fit with the second pushing opening;

the drive member drives the conversion member to rotate through the first transmission portion; and the conversion member rotates to drive vertical movement of the movable portion through the second pushing portion.

11. The clamping-kneading massage structure according to claim 10, wherein the drive assembly further comprises a first transmission member, and the first transmission member is arranged at an output end of the drive member;

the drive member drives the first transmission member to axially rotate in the height direction of the bowl body; and both the first transmission portion and the first transmission member are bevel gears that are meshed with each other.

12. A massager, comprising:

the clamping-kneading massage structure according to claim 1;

a housing;

the clamping-kneading members excluding the clamping-kneading ends are located inside the housing; and the clamping-kneading members are hinged to the housing.

13. The massager according to claim 12, further comprising an air control assembly, wherein the air control assembly is arranged inside the housing;

the air control assembly is communicated with an internal space of the bowl body; and the air control assembly is configured to alternately blow or suck air against the skin in the massage area through the bowl body to apply positive or negative pressure.

14. The massager according to claim 12, wherein the housing comprises an inner shell and an outer shell;

the inner shell is located inside the outer shell, and the inner shell is closely fitted with the outer shell;

the inner shell supports the outer shell; and the inner shell is harder than the outer shell.

15. The massager according to claim 14, wherein the inner shell comprises a first sub-shell and a second sub-shell; and the first sub-shell and the second sub-shell are detachably connected.

16. The massager according to claim 12, wherein the bowl body is detachably connected to the housing.

17. The massager according to claim 12, further comprising a plurality of bowl bodies, wherein openings of the plurality of bowl bodies are different in sizes and shapes.

* * * * *